United States Patent
Jeong et al.

(10) Patent No.: US 8,989,788 B2
(45) Date of Patent: Mar. 24, 2015

(54) METHOD AND APPARATUS FOR UPLINK POWER CONTROL IN WIRELESS COMMUNICATION SYSTEM

(75) Inventors: Su-Ryong Jeong, Suwon-si (KR); Jeong-Ho Park, Seoul (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 13/370,484

(22) Filed: Feb. 10, 2012

(65) Prior Publication Data
US 2012/0208578 A1    Aug. 16, 2012

(30) Foreign Application Priority Data

Feb. 16, 2011 (KR) .................... 10-2011-0013609

(51) Int. Cl.
- *H04B 7/00* (2006.01)
- *H04W 52/24* (2009.01)
- *H04W 52/02* (2009.01)
- *H04W 16/32* (2009.01)

(52) U.S. Cl.
CPC ........ *H04W 52/244* (2013.01); *H04W 52/0212* (2013.01); *H04W 16/32* (2013.01)
USPC ........... 455/501; 455/502; 455/524; 455/438; 455/509; 370/331; 370/330; 370/350

(58) Field of Classification Search
CPC .................................................. H04W 52/244
USPC .......... 455/501, 502, 524, 438, 509; 370/331, 370/330, 350
See application file for complete search history.

(56) References Cited

U.S. PATENT DOCUMENTS

| | | | |
|---|---|---|---|
| 8,064,944 B2* | 11/2011 | Yun ............................. | 455/522 |
| 8,478,202 B2* | 7/2013 | Sutivong et al. ........... | 455/67.13 |
| 2002/0077111 A1* | 6/2002 | Spaling et al. ............... | 455/453 |
| 2006/0094372 A1 | 5/2006 | Ahn et al. | |
| 2010/0296405 A1* | 11/2010 | Madan et al. ................ | 370/252 |

FOREIGN PATENT DOCUMENTS

| | | |
|---|---|---|
| KR | 10-2006-0038131 A | 5/2006 |
| KR | 10-2009-0077622 A | 7/2009 |
| KR | 10-2009-0102419 A | 9/2009 |

* cited by examiner

*Primary Examiner* — Sanh Phu
(74) *Attorney, Agent, or Firm* — Jefferson IP Law, LLP

(57) ABSTRACT

A method and an apparatus for uplink power control in a wireless communication system are provided. More specially, a method is provided in which a first base station in a wireless communication system periodically measures interference for a cell of a second base station neighboring the first base station, determines an average of the periodically measured interference, broadcasts the determined average of the periodically measured interference to mobile terminals located in a cell of the first base station, determines a weight for the determined average of the periodically measured interference, based on one of resource allocation information for the cell of the second base station and whether a specific message for interference regulation is received from the second base station, and transmits the determined weight to the mobile terminals.

27 Claims, 8 Drawing Sheets

METHOD AND APPARATUS FOR UPLINK POWER CONTROL IN WIRELESS COMMUNICATION SYSTEM

PRIORITY

This application claims the benefit under 35 U.S.C. §119 (a) of a Korean patent application filed in the Korean Industrial Property Office on Feb. 16, 2011 and assigned Serial No. 10-2011-0013609, the entire disclosure of which is hereby incorporated by reference.

BACKGROUND OF THE INVENTION

1. Field of the Invention

The present invention relates to a method and an apparatus for communicating in a wireless communication system. More particularly, the present invention relates to a method and apparatus for uplink power control in a wireless communication system.

2. Description of the Related Art

Recently, with the increasing demand for data communication and the continuing development of various communication services in a wireless communication system, there is an urgent need to increase transmission capacity. As a way to satisfy this need for an increase in transmission capacity, technology for heterogeneous networks is being actively studied. A heterogeneous network refers to a communication system in which cells with various phases, cell coverage, and characteristics are mixed and operated.

Hereinafter, a configuration of a related heterogeneous network will be described with reference to FIG. 1.

FIG. 1 illustrates an example of a related heterogeneous network.

Referring to FIG. 1, a heterogeneous network includes a system in which a macro cell 100 and at least one small cell (e.g., pico cells 102, 104, 106) with different-sized cell coverage are overlaid and operated. Although not shown in FIG. 1, the small cell in the cellular network 100 of the macro cell may include a femto cell, a pico cell, and/or the like.

In the heterogeneous network, the transmission capacity of the overall system can be increased by reusing transmission resources of the small cells (e.g., the pico cells 102, 104, 106, a femto cell, or the like) included in the macro cell 100. For example, when one small cell with a transmission band of 10 MHz is included in the macro cell 100 in which a transmission band of 10 MHz is used, a transmission band of 20 MHz in total is available in the macro cell 100. That is, when N small cells are included in one macro cell, a transmission band that is N times as large as an existing transmission band is available in the macro cell, and thus a transmission rate can be increased by N times.

However, in the actual wireless communication environment, there is a problem in that even when N small cells are included in one macro cell, a transmission rate corresponding to N times of an existing transmission rate cannot be obtained and smaller transmission gain is achieved due to interference between heterogeneous cells and non-uniform distribution of mobile terminals. That is, in a related heterogeneous network system, performance degradation may be caused by interference between a macro cell and a small cell, or by interference between small cells. Also, in a related heterogeneous network system, non-uniform distribution of mobile terminals with respect to small cells may cause some resources to be unusable, thereby resulting in performance degradation of the related heterogeneous network system.

Active research has recently been conducted on a network coordinate system employing a centralized control scheme, which uses direct connection links between cells inside and outside a heterogeneous network. The network coordinate system employing a centralized control scheme allows various individual cells included in a wireless communication system to analyze mutual influences between corresponding cells and the associated effects of such influences to collaboratively perform wireless transmission and reception operations. Therefore, in the network coordinate system employing a centralized control scheme, mutual influences between cells can be minimized, and system efficiency can be maximized.

Hereinafter, a related network coordinate system employing a centralized control scheme will be discussed with reference to FIG. 2.

FIG. 2 illustrates an example of a related network coordinate system employing a centralized control scheme.

Referring to FIG. 2, the network coordinate system employing a centralized control scheme includes a central controller 200 for generally controlling cells connected thereto through links or cells connected thereto through a specific network, a macro base station 210 for servicing a wide area or central region, and small cell base stations 220, 230, and 240, each for servicing a narrow area or partial region. For example, each of the small cell base stations 220, 230, and 240 may be a Distributed Antenna System (DAS) cell base station, or relay station.

The macro base station 210 and the small cell base stations 220, 230, and 240 are connected to each other through the central controller 200 and the links. Also, the macro base station 210 and the small cell base stations 220, 230, 240 connected to the central controller 200 can share information with each other. Thus, the macro base station 210 and the small cell base stations 220, 230, and 240 can collaboratively control transmission power or regulate interference. However, a method for controlling power using the above-mentioned centralized control scheme has not been concretely designed. As a result, communication systems must use an existing inefficient power control method in the related network coordinate system employing a centralized control scheme, which results in performance degradation of the related network coordinate system.

Therefore, a need exists for a method and apparatus for effectively controlling the power in a network coordinate system employing a centralized control scheme.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for uplink power control in a wireless communication system.

Another aspect of the present invention is to provide a method and apparatus for allowing one or more cells to collaboratively control uplink power and minimizing mutual interference when the corresponding one or more cells are controlled in a centralized control scheme.

Yet another aspect of the present invention is to provide a method and apparatus for enhancing data transmission efficiency by making it possible to actively regulate interference and optimize a channel condition.

In accordance with an aspect of the present invention, a method for uplink power control by a first base station in a wireless communication system is provided. The method includes periodically measuring interference for a cell of a second base station neighboring the first base station, determining an average of the periodically measured interference, broadcasting the determined average of the periodically measured interference to mobile terminals located in a cell of the first base station, determining a weight for the determined average of the periodically measured interference, based on one of resource allocation information for the cell of the second base station and whether a specific message for interference regulation is received from the second base station, and transmitting the determined weight to the mobile terminals.

In accordance with another aspect of the present invention, a method for uplink power control for a mobile terminal in a wireless communication system is provided. The method includes receiving average interference for a cell of a second base station neighboring a first base station, which corresponds to a serving base station, and a weight for the average interference from the first base station, determining uplink power by using the received average interference and the received weight, and transmitting an uplink signal to the first base station by using the determined uplink power.

In accordance with yet another aspect of the present invention, a first base station in a wireless communication system is provided. The first base station includes a controller for periodically measuring interference for a cell of a second base station neighboring the first base station, determining an average of the periodically measured interference, for broadcasting the determined average of the periodically measured interference to mobile terminals located in a cell of the first base station, for determining a weight for the determined average of the periodically measured interference, based on one of resource allocation information for the cell of the second base station and whether a specific message for interference regulation is received from the second base station, and for transmitting the determined weight to the mobile terminals, a base station interface for receiving the resource allocation information for the cell of the second base station and the specific message for interference regulation from the second base station, under control of the controller, a transmitter for transmitting the determined average of the periodically measured interference and the determined weight to the mobile terminals, and a memory for storing the determined average of the periodically measured interference and the determined weight, under control of the controller.

In accordance with still yet another aspect of the present invention, a mobile terminal in a wireless communication system is provided. The mobile terminal includes a controller for operatively receiving average interference for a cell of a second base station neighboring a first base station, which corresponds to a serving base station, and a weight for the average interference from the first base station, for determining uplink power by using the received average interference and the received weight, and for operatively transmitting an uplink signal to the first base station by using the determined uplink power, a receiver for receiving the average interference and the weight, a memory for storing the average interference and the weight, and a transmitter for transmitting the uplink signal to the first base station.

In accordance with an aspect of the present invention, a method for uplink power control by a first base station in a wireless communication system is provided. The method includes measuring interference for a cell of a second base station neighboring the first base station, determining an average of the measured interference, determining a weight for the determined average of the measured interference, based on one of resource allocation information for the cell of the second base station and whether a specific message for interference regulation is received from the second base station, and transmitting the determined weight to the mobile terminals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
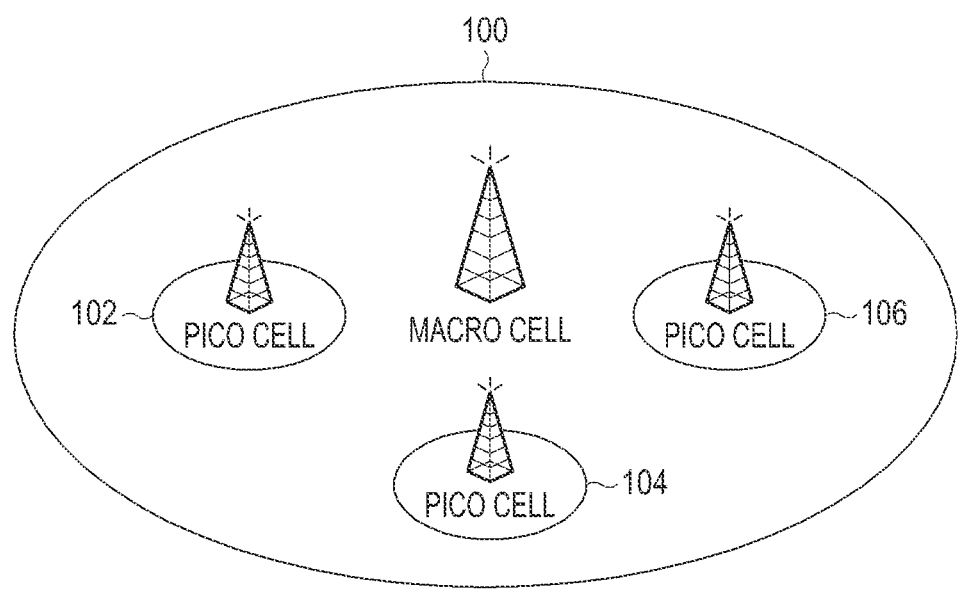
FIG. 1 illustrates an example of a related heterogeneous network.
Figure 2:
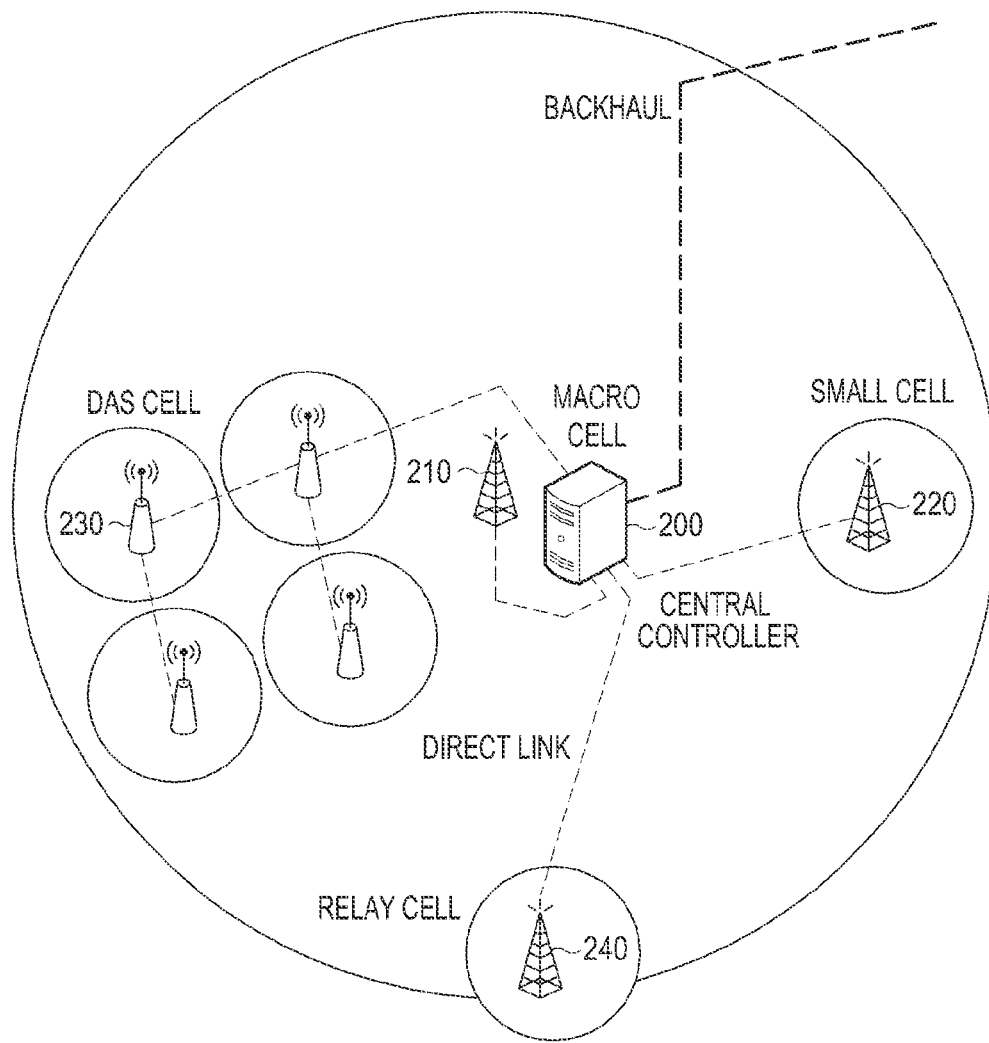
FIG. 2 illustrates an example of a related network coordinate system employing a centralized control scheme.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary embodiment of the present invention proposes a method and apparatus for uplink power control in a wireless communication system. More specially, an exemplary embodiment of the present invention proposes a method and apparatus for allowing one or more cells to collaboratively control uplink power in a wireless communication system in which the corresponding cells are controlled in a centralized control scheme. In a description of exemplary embodiments of the present invention, it should be noted that the term "cell" is mingled with the term "base station".

In a related wireless communication system, individual cells operate independently of each other or exchange only very restrictive information between each other. For example, even when the cells exchange information with each other such information is limited. Thus, in order to control the uplink power, each cell must independently use an uplink power control equation. Also, when a specific cell receives information on neighboring cells, only restrictive information with small overhead is received for long periods.

Accordingly, when interference from neighboring cells is abruptly changed, related methods for uplink power control (e.g., using a related uplink power control equation) experience many problems. More particularly, there are many difficulties in controlling interference from neighboring cells. For example, interference from neighboring cells may abruptly change as the position of a mobile terminal, affecting the interference, varies every frame. Consequently, a related wireless communication has a problem in that it is impossible to improve a data transfer rate and optimize a channel condition through uplink power control.

An uplink power control equation used in a related wireless communication system is represented by Equation 1.

$$P_{Tx} = L + NI + SINR \quad (1)$$

Referring to Equation 1, $P_{Tx}$ denotes transmission power used by a mobile terminal to transmit an uplink signal, L denotes a compensation value for compensating for propagation loss according to a distance between a Base Station (BS) and a mobile terminal, NI denotes a compensation value for compensating for noise and interference received from cells other than a serving cell of the mobile terminal, and SINR denotes the target reception strength of a signal to be received by the BS, that is, a target signal to interference and noise ratio.

Equation 1 is used when each of the cells other than the serving cell of the mobile terminal is an independent cell, and when interference from other cells is differently set for each cell. Therefore, it is difficult for a corresponding BS or mobile terminal to control or manage interference from other cells.

Recently, a wireless communication system may include a heterogeneous network including cells connected according to a centralized control scheme, or including cells that can exchange and share information with each other in real time by using direct connection links. In such a wireless communication system, one or more cells can collaboratively perform transmission and reception operations in real time. More particularly, one or more cells may share information on allocated resources and allocated mobile terminals between cells that are controlled in a centralized control scheme. Accordingly, active interference control can be performed. Active interference control corresponds to an operation in which each of the cells connected according to a centralized control scheme controls interference by using information transmitted/received between corresponding cells. Interference that can be controlled or managed by the active interference control may be referred to as "controllable interference".

Hereinafter, a configuration of a wireless communication system according to an exemplary embodiment of the present invention will be described with reference to FIG. 3.

Figure 3:
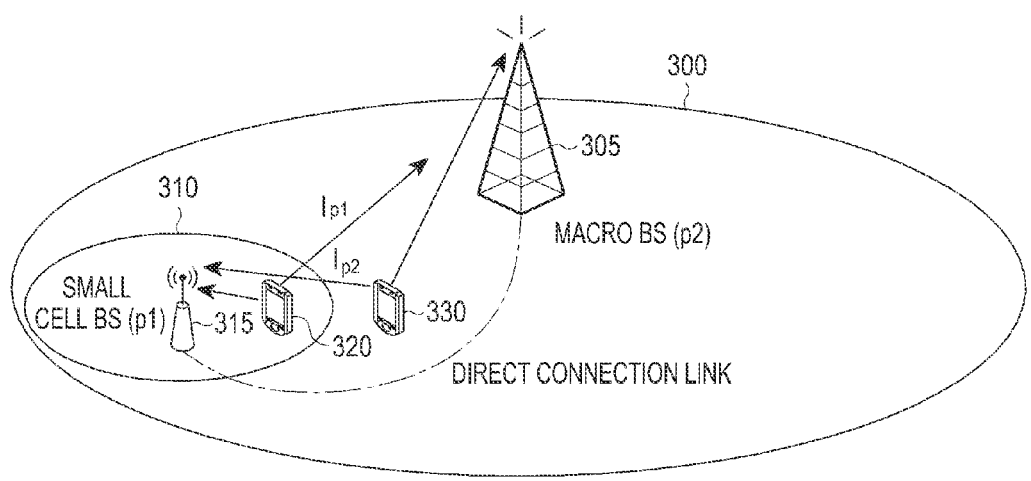
FIG. 3 illustrates a configuration of a wireless communication system according to an exemplary embodiment of the present invention.

FIG. 3 illustrates a configuration of a wireless communication system according to an exemplary embodiment of the present invention.

Referring to FIG. 3, the wireless communication system includes a macro BS 305 for controlling a macro cell (i.e., p2 cell 300), a small cell BS 315 for controlling a small cell (i.e., p1 cell 310) included in the p2 cell 300, a mobile terminal 320 in the small cell (i.e., p1 cell 310), a mobile terminal 330 in the macro cell (i.e., p2 cell 300), and a central controller (not illustrated). The macro BS 305 and the small cell BS 315 perform communications by using a direct connection link. Also, the central controller is connected to the macro BS 305 and the small cell BS 315, and simultaneously controls the macro BS 305 and the small cell BS 315.

According to exemplary embodiments of the present invention, if wireless communication system has such a configuration, then the macro BS 305 and the small cell BS 315 can exchange or share information with each other in real time through the direct connection link. More specially, because the macro BS 305 and the small cell BS 315 are controlled by the same central controller, the macro BS 305 can receive from the small cell BS 315, channel allocation information and positions of mobile terminals, to which channels are allocated, or channel characteristic information associated with the p1 cell 310 of the small cell BS 315. Similarly, the small cell BS 315 can receive from the macro BS 305, channel allocation information, information describing positions of mobile terminals, to which channels are allocated, and/or channel characteristic information in the p2 cell 300 of the macro BS 305.

Accordingly, the macro BS 305 can predict the existence of interference $I_{p1}$ affecting the mobile terminal 330 and its strength, and the small cell BS 315 can also predict the existence of interference $I_{p2}$ affecting the mobile terminal 320 and its strength. Based on such predictions, the macro BS 305 and the small cell BS 315 can perform collaborative power control and regulate mutual interference.

In this way, cells connected according to a centralized control scheme can perform collaborative control in real time, and thus provide network-coordinated service. More particularly, cells connected according to a centralized control scheme can control mutual interference by performing collaborative control for signal transmission.

According to an exemplary embodiment of the present invention, existing interference is divided into two types of interference. For example, the existing interference may be divided into $I_{outer}$ and $I_{control}$, as represented by Equation 2.

$$NI = I_{outer} + I_{control} + \text{Noise} \quad (2)$$

Equation 2 is an interference and noise calculation equation according to an exemplary embodiment of the present invention. Referring to Equation 2, NI denotes interference and noise in a corresponding cell (hereinafter referred to as a "serving cell"), $I_{outer}$ denotes interference from an outer cell not connected to the central controller, $I_{control}$ denotes controllable interference, that is, interference from any other cell connected to the central controller (hereinafter referred to as a "centralized controlled neighboring cell"), and Noise denotes noise in a serving cell or a repeater.

By applying Equation 2 to Equation 1 (i.e., the conventional uplink power control equation), Equation 1 can be represented by Equation 3.

$$P_{Tx}=L+(I_{outer}+\text{Noise})+I_{control}+SINR$$

$$P_{Tx}=L+NI_{outer}+I_{control}+SINR \quad (3)$$

Referring to Equation 3, $P_{Tx}$ denotes transmission power used by a mobile terminal in a serving cell to transmit an uplink signal, $I_{outer}$ and Noise denote interference and noise from an outer cell not connected to the central controller and correspond to $NI_{outer}$, and $I_{control}$ denotes interference from the centralized controlled neighboring cell.

By modifying $I_{control}$ for ease of implementation in Equation 3, Equation 3 can be rewritten as Equation 4.

$$I_{control}=xI_{control\_average}$$

$$P_{Tx}=L+NI_{outer}+xI_{control\_average}+SINR \quad (4)$$

Referring to Equation 4, $I_{control\_average}$ denotes an average of interference from the centralized controlled neighboring cell, and x denotes a weight for $I_{control\_average}$.

More specially, x is an instant weight transmitted by a BS of a serving cell (hereinafter referred to as a "serving BS") to a mobile terminal in the serving cell. According to exemplary embodiments of the present invention, x has multiple bit values. The weight x is transmitted to a corresponding mobile terminal in an instantaneous manner. In other words, the weight x is transmitted to a corresponding mobile terminal at short periods below a threshold value, or each time a mobile terminal is allocated every frame by using a unicast method (in which a signal is transmitted only for a corresponding mobile terminal) or broadcast method (in which a signal is simultaneously transmitted to all mobile terminals or to one or more mobile terminals).

According to exemplary embodiments of the present invention, the serving BS periodically measures interference received from the mobile terminal, and transmits $I_{control\_average}$ to the mobile terminal at longer periods than a preset period by using a broadcast method. $I_{control\_average}$ has a bit value greater and more precise than the bit value of x, and is transmitted from the serving BS to the mobile terminal at periods longer than the period at which x is transmitted.

As an example, when x has a bit value of 3, x may indicate one of the following eight values: [0 (000), 0.25 (001), 0.5 (010), 0.75 (011), 1 (100), 1.25 (101), 1.5 (110), 1.75 (111)]. Accordingly, if x indicates a binary signal of 001, then x corresponds to a value of 0.25, and thus 0.25 times $I_{control\_average}$ is used in the uplink power control equation.

Hereinafter, a method for uplink power control according to an exemplary embodiment of the present invention will be described with reference to FIG. 4.

Figure 4:
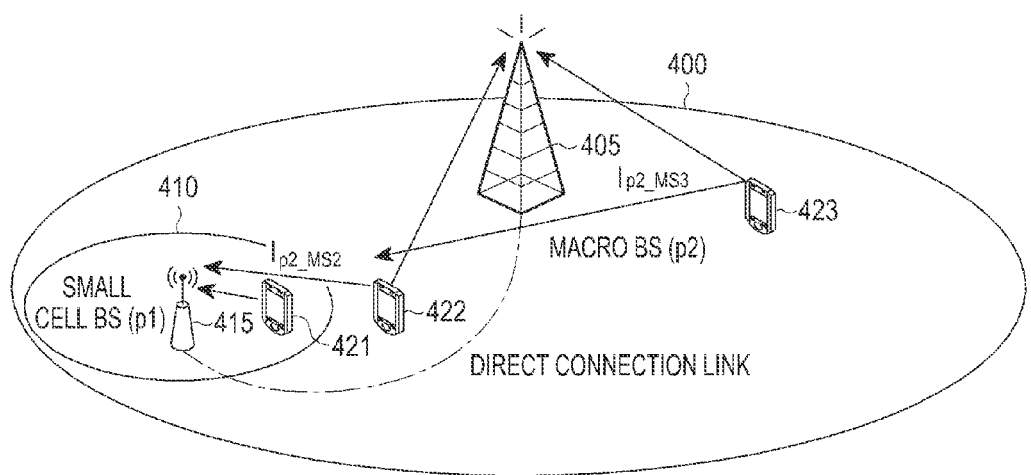
FIG. 4 illustrates a configuration of a wireless communication system in which an uplink power control equation is applied according to an exemplary embodiment of the present invention.

FIG. 4 illustrates a configuration of a wireless communication system in which an uplink power control equation is applied according to an exemplary embodiment of the present invention.

Referring to FIG. 4, the wireless communication system includes a macro BS 405 for controlling a macro cell (i.e., p2 cell 400), a small cell BS 415 for controlling a small cell (i.e., p1 cell 410) included in the p2 cell 400, a first mobile terminal 421 in the p1 cell 410, a second mobile terminal 422, and a third mobile terminal 423 in the p2 cell 400, and a central controller (not illustrated). The macro BS 405 and the small cell BS 415 perform communication by using a direct connection link. Also, the central controller is connected to the macro BS 405 and the small cell BS 415, and simultaneously controls the macro BS 405 and the small cell BS 415.

According to exemplary embodiments of the present invention, in such a wireless communication system, a weight x to be used in the uplink power control equation may be set by two methods.

A first one of these two methods for using the weight x is a method in which a serving BS divides a weight x into a plurality of values, and sets the weight x to one of the plurality of values, based on resource allocation information in a centralized controlled neighboring cell. A second one of the two methods for using the weight x is a method in which a serving BS divides a weight x into a plurality of values, and sets the weight x to one of the plurality of values, based on whether or not the serving BS receives a message for interference regulation from a BS of a centralized controlled neighboring cell, and whether or not an operation according to the received message is performed.

When a serving cell is the macro cell 400, a centralized controlled neighboring cell may be the small cell 410. Also, when a serving cell is the small cell 410, a centralized controlled neighboring cell may be the macro cell 400. For the convenience of description, the following description of a method of setting a weight x will be described based on the assumption that a serving cell is the small cell 410 and a centralized controlled neighboring cell is the macro cell 400. Of course, the method of setting a weight x may be used in a similar manner when a serving cell is the macro cell 400 and a centralized controlled neighboring cell is the small cell 410. Hereinafter, an exemplary method of setting a weight x will be described with reference to FIG. 5.

Figure 5:
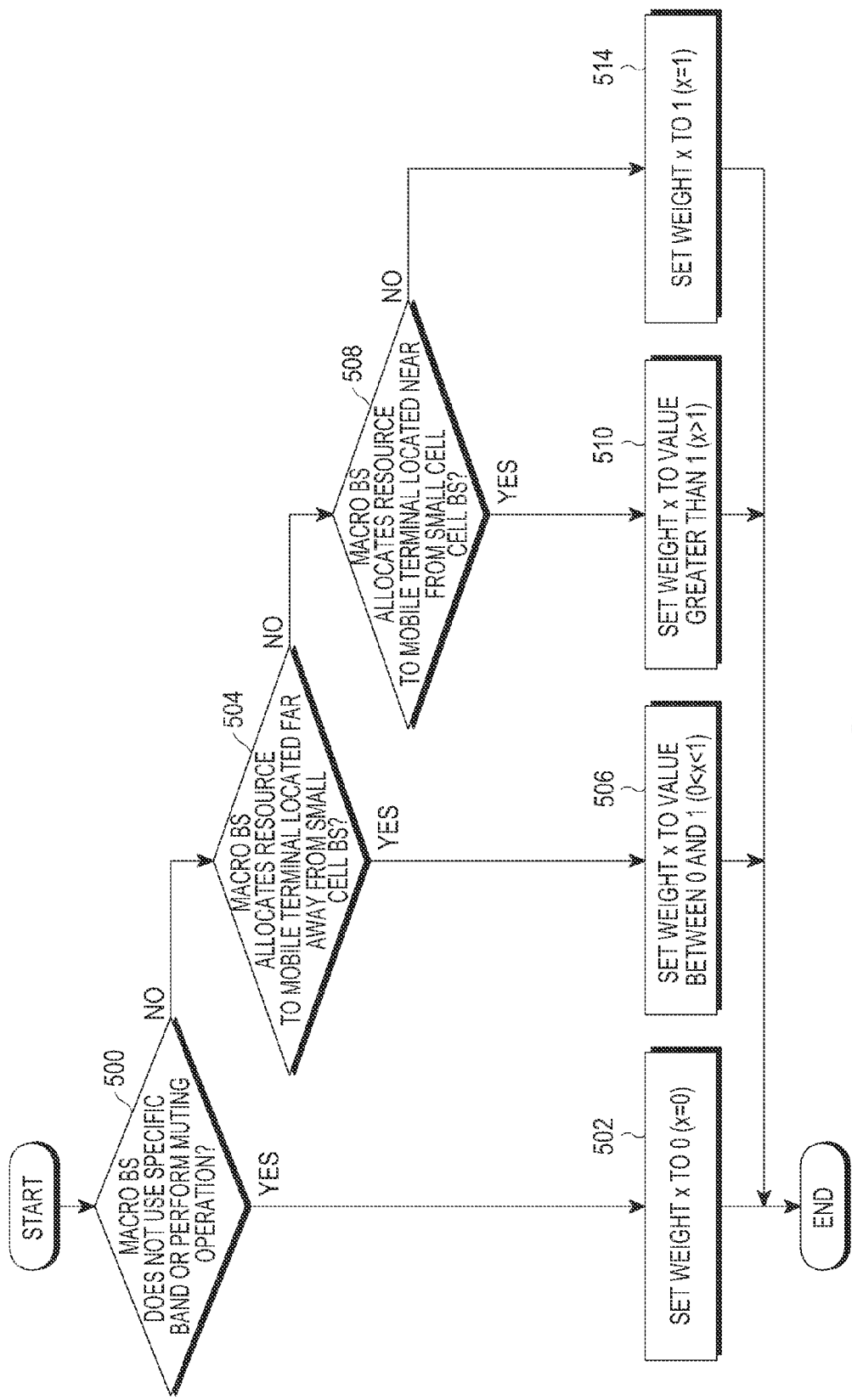
FIG. 5 is a flowchart illustrating a method for setting a weight x for uplink power control in a serving base station according to an exemplary embodiment of the present invention.

FIG. 5 illustrates a method of setting a weight x for uplink power control in a serving BS according to an exemplary embodiment of the present invention.

Referring to FIG. 5, for the convenience of description, reference will be made to the wireless communication system shown in FIG. 4, and it is assumed that a serving BS is the small cell BS 415. As mentioned above, a serving BS may also be the macro BS 405, and in this case, a centralized controlled neighboring cell may be the small cell 410.

According to an exemplary embodiment of the present invention, when a serving BS is the small cell BS 415, the small cell BS 415 may receive resource allocation information for the macro cell 400 from the macro BS 405. The resource allocation information from the macro BS 405 may be transmitted to the small cell BS 415 at the request of the small cell BS 415 or under instructions from a central controller. Upon receiving the resource allocation information from the macro BS 405, the small cell BS 415 performs the following operation by using the received resource allocation information.

In step 500, the small cell BS 405 determines if the macro BS 405 does not use a specific band (i.e., a band where the p1 cell 410 is affected by interference) or if the macro BS 405 performs a muting operation. That is, the small cell BS 415 determines if the macro BS 405 does not allocate a mobile terminal to a specific band or uses a muting subframe, in which allocation is not performed for the overall subframe, at the request of the small cell BS 415 or according to the judgment of the macro BS 405 itself.

When the macro BS 405 does not use the specific band or when the macro BS 405 performs the muting operation, in step 502, the small cell BS 415 sets a weight x to 0 (i.e., x=0). Also, the small cell BS 415 transmits the weight x (i.e., x being set to 0) to the first mobile terminal 421 while allocating a resource to the first mobile terminal 421. The first mobile terminal 421 can recognize that there is no interference from the macro BS 405 when transmitting an uplink signal by using the allocated resource. Accordingly, the first mobile terminal may perform uplink power control in consideration of only interference from an outer cell not connected to the central controller, when necessary. In such an example, the equation used for uplink power control may be represented by Equation 5.

$$P_{Tx} = L + NI_{outer} + 0 \cdot I_{control\_average} + SINR = L + NI_{outer} + SINR \quad (5)$$

When uplink power control is performed using Equation 5, power consumption can be reduced and/or minimized because power used by such a system is less than power used by related communication systems. Further, uplink interference may be reduced and/or minimized.

When the macro BS 405 uses the specific band or does not perform the muting operation in step 500, the small cell BS 415 proceeds to step 504.

In step 504, the small cell BS 415 determines whether the macro BS 405 allocates a resource to a mobile terminal far away from the small cell BS 415 (e.g., the third mobile terminal 423). The mobile terminal located far away from the small cell BS 415 refers to a mobile terminal that is located beyond a predetermined distance from the small cell BS 415.

When the macro BS 405 allocates a resource to the third mobile terminal 423, the small cell BS 415 determines that uplink interference caused by the third mobile terminal 423 is smaller than uplink interference caused by other mobile terminals. For example, the small cell BS 415 may determine that the uplink interference caused by the third mobile terminal 423 is smaller than the uplink interference caused by any other mobile terminal Accordingly, the small cell BS 415 proceeds to step 506, and sets a weight x to a value between 0 and 1 (0<x<1). Also, the small cell BS 415 transmits the weight x (i.e., the weight x being set to a value between 0 and 1) to the first mobile terminal 421.

When the macro BS 405 does not allocate a resource to the third mobile terminal 423 in step 504, the small cell BS 415 proceeds to step 508. In step 508, the small cell BS 415 determines whether the macro BS 405 allocates a resource to a mobile terminal located near to the small cell BS 415 (e.g., the second mobile terminal 422). The mobile terminal located near to the small cell BS 415 refers to a mobile terminal that is located within a predetermined distance from the small cell BS 415.

When the macro BS 405 allocates a resource to the second mobile terminal 422, the small cell BS 415 determines that uplink interference caused by the second mobile terminal 423 is larger than uplink interference caused by another mobile terminal For example, the small cell BS 415 may determine whether uplink interference caused by the small mobile terminal 423 is larger than uplink interference caused by any other mobile terminal. Accordingly, the small cell BS 415 proceeds to step 510, and sets a weight x to a value greater than 1 (x>1). Also, the small cell BS 415 transmits the weight x (e.g., the weight x being set to a value greater than 1) to the first mobile terminal 421.

When the macro BS 405 does not allocate a resource to the second mobile terminal 422 in step 508 (e.g., when the macro BS 405 uses a related uplink power control equation), the small cell BS 415 proceeds to step 514, and sets a weight x to 1 (x=1). Also, the small cell BS 415 transmits the weight x (e.g., the weight x being set to 1) to the first mobile terminal 421. An equation used for uplink power control may be represented by Equation 6.

$$P_{Tx} = L + NI_{outer} + I_{control\_average} + SINR = L + NI + SINR \quad (6)$$

Referring to Equation 6, when a weight x is set to 1, the uplink power control equation is the same as the uplink power control equation used in related systems such as that having an uplink power control equation given in Equation 1.

An exemplary method for setting a weight x for uplink power control will be described with reference to FIG. 6.

Figure 6:
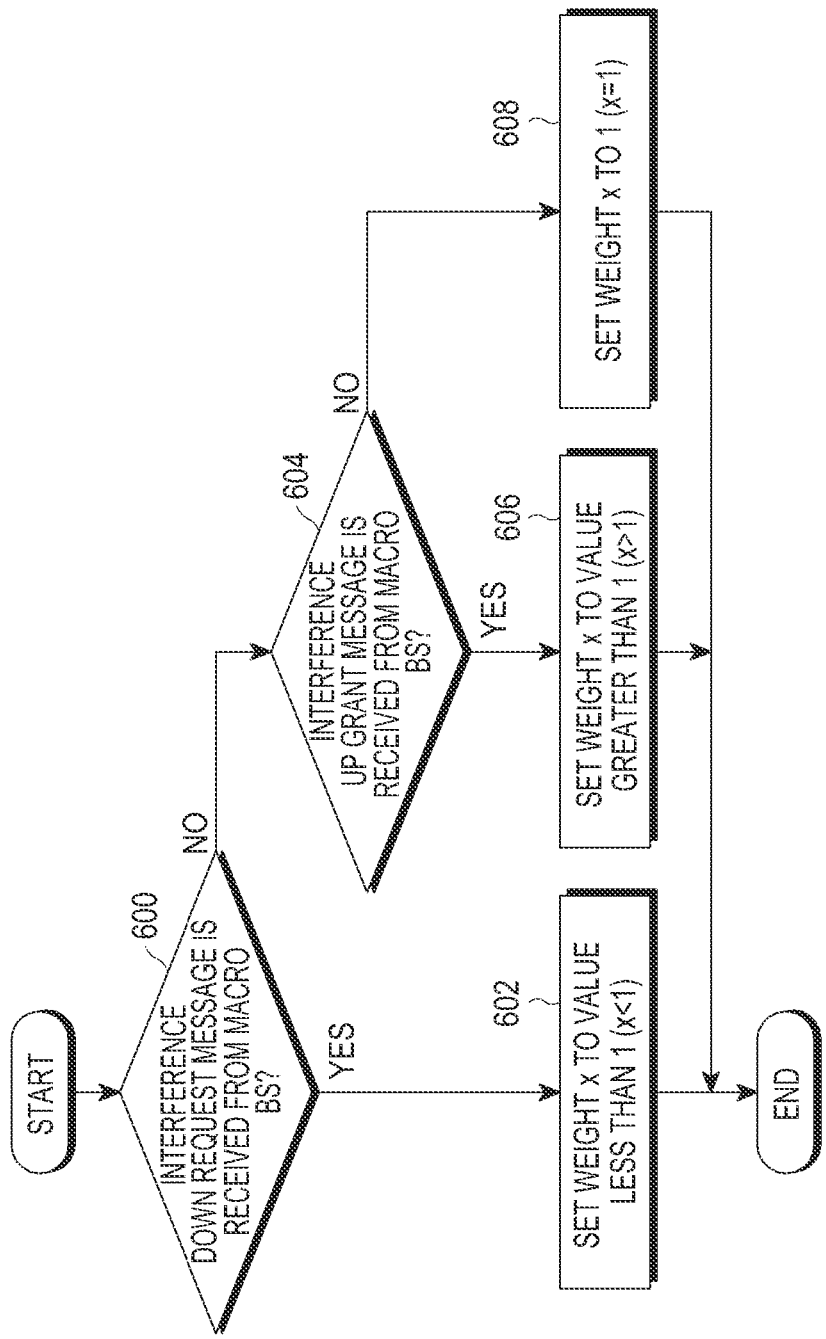
FIG. 6 is a flowchart illustrating a method for setting a weight x for uplink power control in a serving base station according to an exemplary embodiment of the present invention.

FIG. 6 illustrates a method for setting a weight x for uplink power control in a serving BS according to an exemplary embodiment of the present invention.

Referring to FIG. 6, for the convenience of description, reference will be made to a wireless communication system such as, for example, the wireless communication system illustrated in FIG. 4. It is assumed that a serving BS is the small cell BS 415. As mentioned above, a serving BS may also be the macro BS 405, and in this case, a centralized controlled neighboring cell may be the small cell 410.

According to an exemplary embodiment of the present invention, if a serving BS is the small cell BS 415, then the small cell BS 415 can receive a message for interference regulation from the macro BS 405. The message for interference regulation includes an interference down request message, and an interference up grant message. More specially, when interference imposed on the p2 cell 400 by the small cell BS 415 exceeds a threshold value, the macro BS 405 transmits to the small cell BS 415 an interference down request message, which indicates a request to reduce interference. Contrarily, when interference imposed on the p2 cell 400 by the small cell BS 415 does not exceed a threshold value, the macro BS 405 transmits to the small cell BS 415 an interference up grant message, which indicates a grant to increase interference from the p1 cell 410.

Thus, in step 600, the small cell BS 415 determines whether an interference down request message is received from the macro BS 405. When the small cell BS 415 receives an interference down request message and accepts an interference down request according to the interference down request message, the small cell BS 415 proceeds to step 602, and sets a weight x to a value less than 1 (i.e., x<1). Also, the small cell BS 415 transmits the weight x (e.g., the weight x being set to a value less than 1) to the first mobile terminal 421. The first mobile terminal 421 lowers uplink power by using the weight x set to a value less than 1, and thus the interference imposed on the p2 cell 400 can be reduced.

When an interference down request message is not received from the macro BS 405 in step 600, the small cell BS 415 proceeds to step 604 and determines whether an interference up grant message is received from the macro BS 405.

When an interference up grant message is received from the macro BS 405 and there is a need to enhance reception signal sensitivity for a signal transmitted from the first mobile terminal 421, the small cell BS 415 proceeds to step 606, and sets a weight x to a value greater than 1 (i.e., x>1). Also, the small cell BS 415 transmits the weight x (e.g., the weight x being set to a value greater than 1) to the first mobile terminal 421. Thus, the uplink transmission power of the first mobile terminal 421 is increased, and thus the small cell BS 415 can receive a signal, the signal sensitivity of which is improved.

When an interference up grant message is not received from the macro BS 405 in step 604 and there is no need to enhance reception signal sensitivity for a signal transmitted from the first mobile terminal 421 or when uplink power and interference control using the conventional uplink power control equation is desired, the small cell BS 415 proceeds to step 608, and sets a weight x to 1 (i.e., x=1). Also, the small cell BS 415 transmits the weight x (e.g., weight x being set to 1) to the first mobile terminal 421.

According to exemplary embodiments of the present invention, methods for setting a weight x as illustrated in FIGS. 5 and 6 can be summarized as shown in Table 1.

TABLE 1

| weight x for first mobile terminal, determined by small cell BS (serving BS) | operation of macro BS (BS of centralized controlled neighboring cell) |
| --- | --- |
| x > 1 | (1) when resource is allocated to mobile terminal located near from p1 cell (2) interference affecting p2 cell is below threshold value and thus it is granted to increase transmission power in p1 cell |
| x = 1 | (1) when (existing) typical interference situation occurs (2) when each cell performs independent uplink power control |
| 0 < x < 1 | (1) when resource is allocated to mobile terminal far away from p1 cell (2) interference affecting p2 cell is above threshold value and thus it is requested to reduce interference imposed on p1 cell |
| x = 0 | when muting subframe is used or mobile terminal is not allocated to corresponding band |

Hereinafter, an exemplary operation of a serving BS will be described with reference to FIG. 7.

Figure 7:
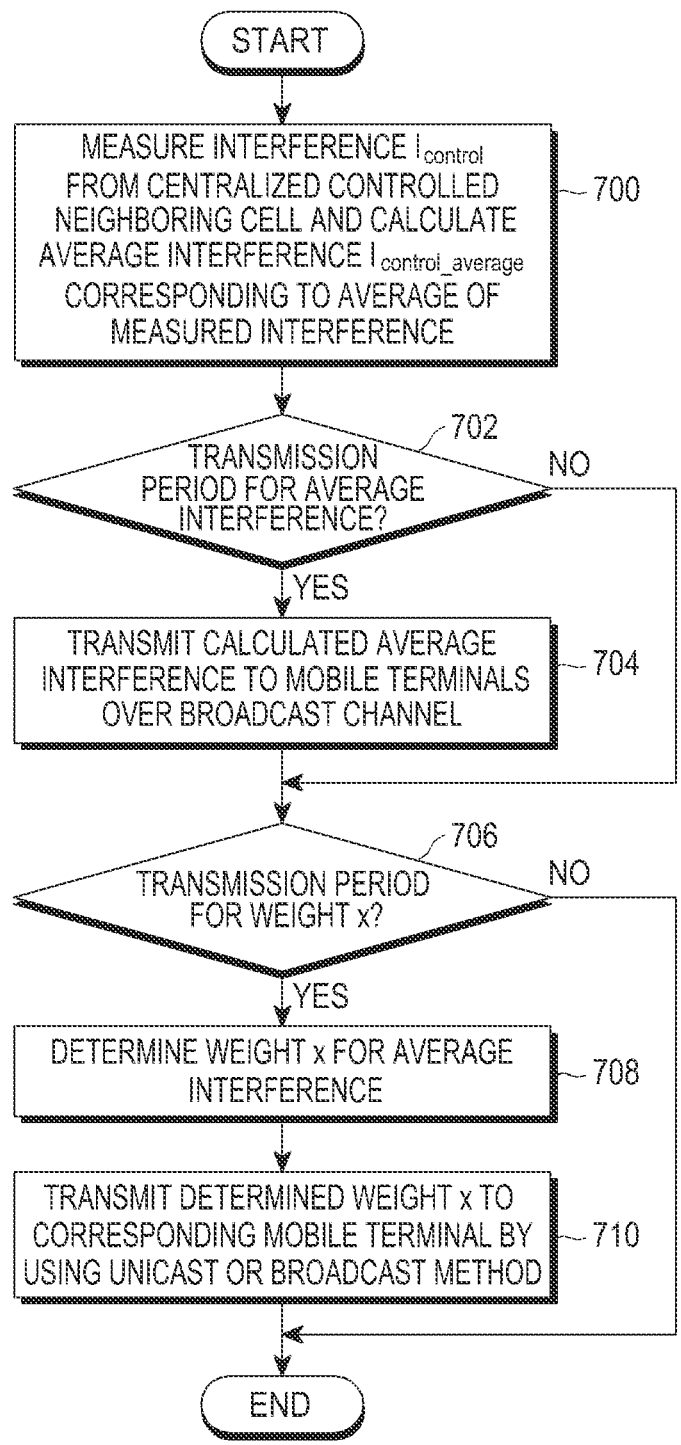
FIG. 7 is a flowchart illustrating an operation of a serving base station according to an exemplary embodiment of the present invention.

FIG. 7 illustrates an operation of a serving BS according to an exemplary embodiment of the present invention.

Referring to FIG. 7, in step 700, the serving BS periodically measures interference $I_{control}$ from a centralized controlled neighboring cell for a predetermined period of time, and determines average interference $I_{control\_average}$ corresponding to an average of the measured interference. In step 702, the serving BS determines whether a transmission period for the average interference is reached.

When a transmission period for the average interference is reached, the serving BS proceeds to step 704, and transmits the determined average interference to mobile terminals located in its cell over a broadcast channel. Also, in step 706, the serving BS determines whether a transmission period for a weight x for each mobile terminal, to be used for uplink power control, is reached.

When a transmission period for the weight x is reached, the serving BS proceeds to step 708, and determines the weight x in consideration of a resource allocation state, a channel allocation state, and states and positions of mobile terminals in the macro cell. A procedure of determining the weight x has been described above with reference to FIGS. 5 and 6, so a detailed description thereof will be omitted here.

Upon the weight x being determined, the serving BS proceeds to step 710, and transmits the determined weight x to a corresponding mobile terminal by using a unicast or broadcast method.

An exemplary operation of a mobile terminal will be described with reference to FIG. 8.

Figure 8:
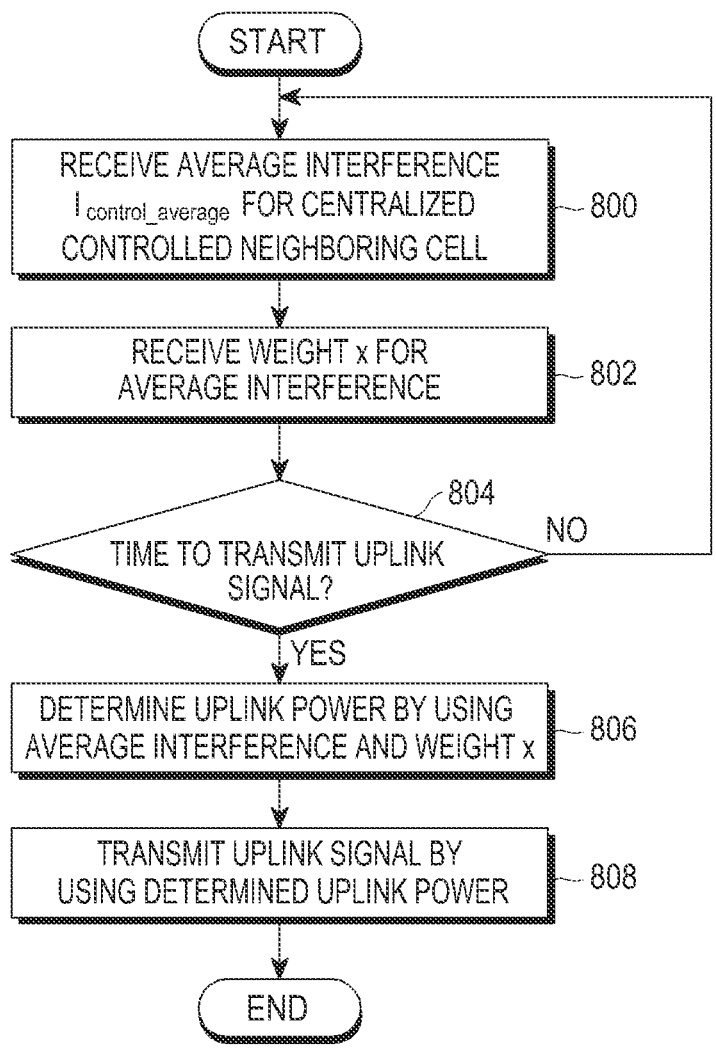
FIG. 8 is a flowchart illustrating an operation of a mobile terminal according to an exemplary embodiment of the present invention.

FIG. 8 illustrates an operation of a mobile terminal according to an exemplary embodiment of the present invention.

Referring to FIG. 8, in step 800, the mobile terminal receives average interference $I_{control\_average}$ for a centralized controlled neighboring cell from a serving BS. For example, the mobile terminal may receive the average interference $I_{control\_average}$ for a centralized controlled neighboring cell from a serving BS over a broadcast channel. Also, in step 802, the mobile terminal receives a weight x for the average interference from the serving BS. The mobile terminal may receive the weight x for the average interference over a unicast or broadcast channel. The mobile terminal may periodically receive the average interference and the weight x, and the time to receive the average interference and the time to receive the weight x may be the same or different depending on when the serving BS transmits the average interference and the weight x.

In step 804, the mobile terminal determines whether it is time to transmit an uplink signal to the serving BS. When it is time to transmit an uplink signal to the serving BS, in step 806, the mobile terminal determines uplink power by using the average interference and the weight x. More specially, the mobile terminal determines uplink power by using the uplink power control equation according to an exemplary embodiment of the present invention (i.e., "$P_{Tx}=L+NI_{outer}+xI_{control\_average}+SINR$" given in Equation 4). Also, in step 808, the mobile terminal transmits the uplink signal to the serving BS by using the determined uplink power.

Hereinafter, an internal structure of a serving BS will be described with reference to FIG. 9.

Figure 9:
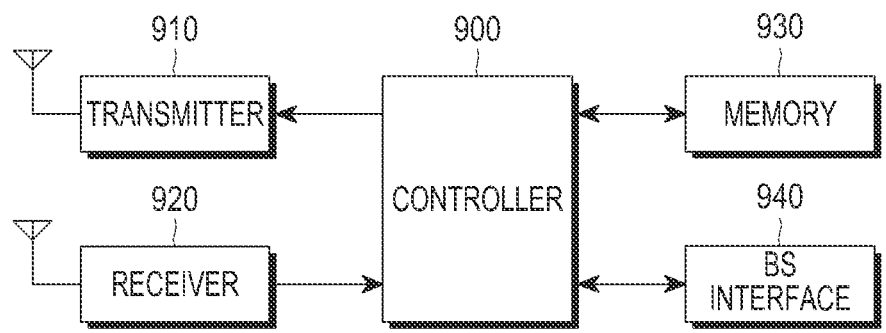
FIG. 9 is a block diagram illustrating an internal structure of a serving base station according to an exemplary embodiment of the present invention.

FIG. 9 illustrates an exemplary internal structure of a serving BS according to an exemplary embodiment of the present invention.

Referring to FIG. 9, the serving BS includes a controller 900, a transmitter 910, a receiver 920, a memory 930, and a BS interface 940.

The controller 900 operatively controls the transmitter 901, the receiver 920, the memory 930, and the BS interface 940. Further, the controller 900 operatively controls the overall operation of the serving BS. More particularly, the controller 900 performs operations corresponding to the serving BS's operations as illustrated and described above in FIGS. 5 to 7.

More specially, the controller 900 measures interference from a centralized controlled neighboring cell, and determines average interference corresponding to an average of the measured interference. Also, when a transmission period for the average interference is reached, the controller 900 operatively transmits the determined average interference to mobile terminals located in a cell of the serving BS over a broadcast channel.

Further, when a transmission period for a weight x to be used for uplink power control is reached, the controller 900 determines the weight x for the determined average interference. With regard to this, the controller 900 determines the weight x in consideration of a resource allocation state, a channel allocation state, and position and state information for mobile terminals in the centralized controlled neighboring cell. Upon the weight x being determined, the controller 900 operatively transmits the determined weight x to a corresponding mobile terminal For example, the controller 900 may operatively transmit the determined weight x using a unicast or broadcast method.

The transmitter 910 transmits the average interference to mobile terminals located in the cell of the serving BS by using a broadcast method, under the control of the controller 900. Also, the transmitter 910 transmits the weight x for the average interference to a corresponding mobile terminal For example, according to exemplary embodiments of the present invention, the transmitter 910 transmits the weight x by using a unicast or broadcast method.

The receiver 920 receives an uplink signal from a mobile terminal, under the control of the controller 900.

The memory 930 stores the average interference and the weight x, under the control of the controller 900.

The BS interface 940 performs communications with the centralized controlled neighboring cell. More specially, the BS interface 940 receives a resource allocation state, a channel allocation state, and position and state information for mobile terminals in the centralized controlled neighboring cell from the centralized controlled neighboring cell.

An exemplary internal structure of a mobile terminal will be described with reference to FIG. 10.

Figure 10:
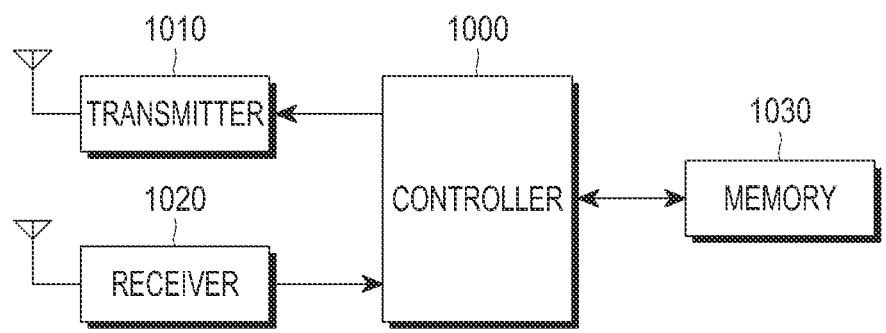
FIG. 10 is a block diagram illustrating an internal structure of a mobile terminal according to an exemplary embodiment of the present invention.

FIG. 10 illustrates an internal structure of a mobile terminal according to an exemplary embodiment of the present invention.

Referring to FIG. 10, the mobile terminal includes a controller 1000, a transmitter 1010, a receiver 1020, and a memory 1030.

The controller 1000 controls the transmitter 1010, the receiver 1020, and the memory 1030, and controls the overall operation of the mobile terminal More particularly, the controller 1000 performs an operation corresponding to the mobile terminal's operation as illustrated and described in FIG. 8.

More specially, on receiving average interference for a macro cell and a weight x for the average interference from a serving BS, the controller 1000 determines whether it is time to transmit an uplink signal to the serving BS. When it is time to transmit an uplink signal to the serving BS, the controller 1000 determines uplink power by using the received average interference and the received weight x. For example, according to exemplary embodiments of the present invention, the controller 1000 determines uplink power by using the uplink power control equation provided in Equation 4 (i.e., "$P_{Tx}=L+NI_{outer}+xI_{control\_average}+SINR$"). Also, the controller 1000 operatively transmits the uplink signal to the serving BS by using the determined uplink power.

The transmitter 1010 transmits the uplink signal to the serving BS, under the control of the controller 1000.

The receiver 1020 receives the average interference over a broadcast channel, under the control of the controller 1000. Also, the receiver 1020 receives the weight x over a unicast or broadcast channel, under the control of the controller 1000. The receiver 1020 may periodically receive the average interference and the weight x, and the time to receive the average interference and the time to receive the weight x may be the same or different depending on when the serving BS transmits them.

The memory 1030 stores the average interference, the weight x, and the uplink power, under the control of the controller 1000.

As described above, exemplary embodiments of the present invention allow one or more cells to collaboratively control uplink power in a wireless communication system in which the corresponding cells are controlled in a centralized control scheme. Thus, according to exemplary embodiments of the present invention, unnecessary interference between the corresponding cells can be reduced and/or minimized, and needless power consumption can be reduced and/or prevented, which thereby improves the power efficiency of a mobile terminal Also, exemplary embodiments of the present invention can enhance transmission efficiency by actively regulating interference and optimizing a channel condition.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for uplink power control by a first base station in a wireless communication system, the method comprising:
   periodically measuring interference for a cell of a second base station neighboring the first base station;
   determining an average of the periodically measured interference;
   broadcasting the determined average of the periodically measured interference to mobile terminals located in a cell of the first base station;
   determining a weight for the determined average of the periodically measured interference, based on one of resource allocation information for the cell of the second base station and an interference regulation request of the second base station; and
   transmitting the determined weight to the mobile terminals.

2. The method of claim 1, wherein the first and second base stations communicate with each other under control of a central controller.

3. The method of claim 1, wherein the determining of the weight comprises:
   setting the weight to a first value if it is determined that the second base station does not use a band in which the cell of the first base station is affected by interference or if it is determined that the second base station uses a muting subframe;
   setting the weight to a value between the first value and a second value if it is determined that the second base station allocates a resource to a mobile terminal located beyond a predetermined distance from the cell of the first base station; and
   setting the weight to a value greater than the second value if it is determined that the second base station allocates a resource to a mobile terminal located within the predetermined distance from the cell of the first base station.

4. The method of claim 1, wherein the determining of the weight comprises:
   setting the weight to a value less than a first value if the interference regulation request is a request to down-regulate interference imposed on the cell of the second base station from the cell of the first base station; and
   setting the weight to a value greater than the first value if the interference regulation request is a request to up-regulate the interference.

5. The method of claim 1, further comprising receiving an uplink signal from each of the mobile terminals,
   wherein the determined average of the periodically measured interference and the determined weight are used for determining uplink power to transmit the uplink signal in each of the mobile terminals.

6. The method of claim 5, wherein the uplink power is determined using a following equation, $$I_{control}=xI_{control\_average}$$

$$P_{Tx}=L+NI_{outer}+xI_{control\_average}+SINR$$

where, $I_{control}$ denotes interference from the cell of the second base station, x denotes the weight, $I_{control\_average}$ denotes the determined average of the periodically measured interference, $P_{Tx}$ denotes the uplink power, L denotes a compensation value for compensating for propagation loss according to a distance between the first base station and a corresponding mobile terminal, $NI_{outer}$ denotes noise and interference from the cell of the second base station and other cells, and SINR denotes a target signal to interference and noise ratio of a signal to be received by the first base station.

7. The method of claim 1, wherein the transmitting of the determined weight to the mobile terminals comprises transmitting the determined weight by one of unicast or broadcasting.

8. A method for uplink power control for a mobile terminal in a wireless communication system, the method comprising:
receiving average interference for a cell of a second base station neighboring a first base station, which corresponds to a serving base station, and a weight for the average interference from the first base station;
determining uplink power by using the received average interference and the received weight; and
transmitting an uplink signal to the first base station by using the determined uplink power,
wherein the weight is determined based on one of resource allocation information for the cell of the second base station and an interference regulation request of the second base station.

9. The method of claim 8, wherein the first and second base stations communicate with each other under control of a central controller.

10. The method of claim 8, wherein the determining of the uplink power comprises determining the uplink power by using a following equation, $$I_{control} = xI_{control\_average}$$

$$P_{Tx} = L + NI_{outer} + xI_{control\_average} + SINR$$

where, $I_{control}$ denotes interference from the cell of the second base station, x denotes the weight, $I_{control\_average}$ denotes the average interference, $P_{Tx}$ denotes the uplink power, L denotes a compensation value for compensating for propagation loss according to a distance between the first base station and the mobile terminal, $NI_{outer}$ denotes noise and interference from the cell of the second base station and other cells, and SINR denotes a target signal to interference and noise ratio of a signal to be received by the first base station.

11. A first base station in a wireless communication system, the first base station comprising:
a controller configured to periodically measure interference for a cell of a second base station neighboring the first base station, to determine an average of the periodically measured interference, to broadcast the determined average of the periodically measured interference to mobile terminals located in a cell of the first base station, to determine a weight for the determined average of the periodically measured interference, based on one of resource allocation information for the cell of the second base station and an interference regulation request of the second base station, and to transmit the determined weight to the mobile terminals;
a base station interface configured to receive the resource allocation information for the cell of the second base station and the message for interference regulation from the second base station under control of the controller;
a transmitter configured to transmit the determined average of the periodically measured interference and the determined weight to the mobile terminals; and
a memory configured to store the determined average of the periodically measured interference and the determined weight under control of the controller.

12. The first base station of claim 11, wherein the first and second base stations communicate with each other under control of a central controller.

13. The first base station of claim 11, wherein the controller is configured to set the weight to a first value if it is determined that the second base station does not use a band in which the cell of the first base station is affected by interference or uses a muting subframe, to set the weight to a value between the first value and a second value if it is determined that the second base station allocates a resource to a mobile terminal located beyond a predetermined distance from the cell of the first base station, and to set the weight to a value greater than the second value if it is determined that the second base station allocates a resource to a mobile terminal located within the predetermined distance from the cell of the first base station.

14. The first base station of claim 11, wherein the controller is configured to set the weight to a value less than a first value if the interference regulation request is a request to down-regulate interference imposed on the cell of the second base station from the cell of the first base station, and to set the weight to a value greater than the first value if the interference regulation request is a request to up-regulate the interference.

15. The first base station of claim 11, further comprising a receiver configured to receive an uplink signal from each of the mobile terminals,
wherein the determined average of the periodically measured interference and the determined weight are used for determining uplink power to transmit the uplink signal in each of the mobile terminals.

16. The first base station of claim 15, wherein the uplink power is determined using a following equation, $$I_{control} = xI_{control\_average}$$

$$P_{Tx} = L + NI_{outer} + xI_{control\_average} + SINR$$

where, $I_{control}$ denotes interference from the cell of the second base station, x denotes the weight, $I_{control\_average}$ denotes the determined average of the periodically measured interference, $P_{Tx}$ denotes the transmission power, L denotes a compensation value for compensating for propagation loss according to a distance between the first base station and a corresponding mobile terminal, $NI_{outer}$ denotes noise and interference from the cell of the second base station and other cells, and SINR denotes a target signal to interference and noise ratio of a signal to be received by the first base station.

17. The first base station of claim 11, wherein the transmitter is configured to transmit the determined weight by one of unicast and broadcasting.

18. A mobile terminal in a wireless communication system, the mobile terminal comprising:
a controller configured to receive average interference for a cell of a second base station neighboring a first base station, which corresponds to a serving base station, and a weight for the average interference from the first base station, to determine uplink power by using the received average interference and the received weight, and to transmit an uplink signal to the first base station by using the determined uplink power;
a receiver configured to receive the average interference and the weight;
a memory configured to store the average interference and the weight; and a transmitter configured to transmit the uplink signal to the first base station.

19. The mobile terminal of claim 18, wherein the first and second base stations communicate with each other under control of a central controller.

20. The mobile terminal of claim 18, wherein the controller is configured to determine the uplink power by using a following equation, $$I_{control} = xI_{control\_average}$$

$$P_{Tx} = L + NI_{outer} + xI_{control\_average} + SINR$$

where, $I_{control}$ denotes interference from the cell of the second base station, x denotes the weight, $I_{control\_average}$ denotes the average interference, $P_{Tx}$ denotes the uplink power, L denotes a compensation value for compensating for propagation loss according to a distance between the first base station and the mobile terminal, $NI_{outer}$ denotes noise and interference from the cell of the second base station and other cells, and SINR denotes a target signal to interference and noise ratio of a signal to be received by the first base station.

21. A method for uplink power control by a first base station in a wireless communication system, the method comprising:
    measuring interference for a cell of a second base station neighboring the first base station;
    determining an average of the measured interference;
    determining a weight for the determined average of the measured interference, based on one of resource allocation information for the cell of the second base station and an interference regulation request of the second base station; and
    transmitting the determined weight to the mobile terminals.

22. The method of claim 21, further comprising receiving an uplink signal from each of the mobile terminals,
    wherein the determined average of the measured interference and the determined weight are used for determining uplink power to transmit the uplink signal in each of the mobile terminals.

23. The method of claim 8, wherein the weight for the average interference is determined based on one of resource allocation information for the cell of the second base station and whether a message for interference regulation is received from the second base station.

24. The mobile terminal of claim 18, wherein the weight for the average interference is determined based on one of resource allocation information for the cell of the second base station and whether a message for interference regulation is received from the second base station.

25. The method of claim 1, wherein the determining of the weight comprises:
    determining one of a resource used by the second base station and a position of mobile terminals in the cell of the second base station based on the resource allocation information; and
    determining the weight for the determined average of the periodically measured interference, based on the one of the resource used by the second base station and the position of the mobile terminals in the cell of the second base station.

26. The method of claim 8, wherein the weight is determined based on the one of a resource used by the second base station and a position of mobile terminals in the cell of the second base station, and the resource used by the second base station and the position of the mobile terminals in the cell of the second base station are determined based on the resource allocation information.

27. The method of claim 21, wherein the determining of the weight comprises:
    determining one of a resource used by the second base station and a position of mobile terminals in the cell of the second base station based on the resource allocation information; and
    determining the weight for the determined average of the periodically measured interference, based on the one of the resource used by the second base station and the position of the mobile terminals in the cell of the second base station.

* * * * *